Feb. 27, 1945.  H. R. BAGLEY  2,370,282
CLUTCH CONTROLLED POWER TRANSMISSION MECHANISM FOR MACHINE TOOLS
Filed Nov. 27, 1943  3 Sheets-Sheet 1

Inventor
H. R. Bagley

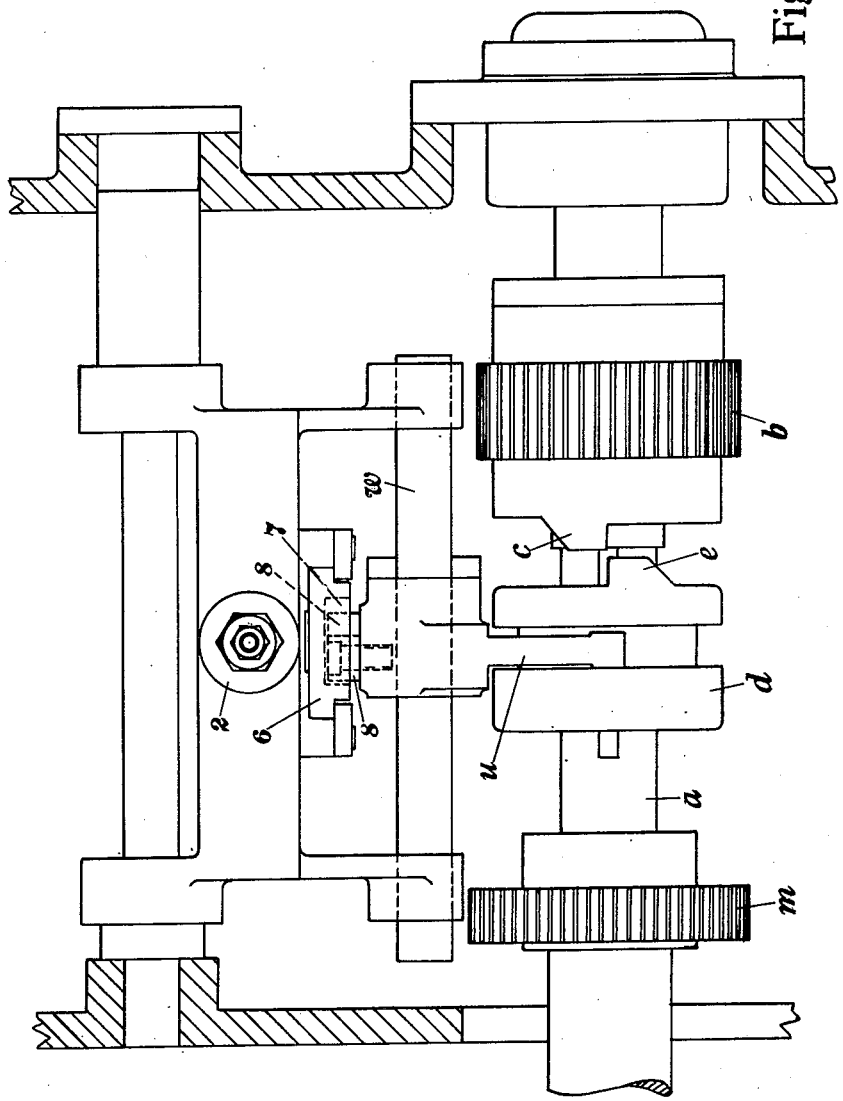

Feb. 27, 1945.　　　H. R. BAGLEY　　　2,370,282
CLUTCH CONTROLLED POWER TRANSMISSION MECHANISM FOR MACHINE TOOLS
Filed Nov. 27, 1943　　　3 Sheets-Sheet 3

Inventor
H. R. Bagley
By Glascock Downing Seebold
Attys

Patented Feb. 27, 1945

2,370,282

UNITED STATES PATENT OFFICE 2,370,282

CLUTCH CONTROLLED POWER TRANSMISSION MECHANISM FOR MACHINE TOOLS

Harold Richard Bagley, Tile Hill, Coventry, England, assignor to A. C. Wickman Limited, Coventry, England Application November 27, 1943, Serial No. 512,011
In Great Britain December 17, 1942

2 Claims. (Cl. 74—368)

The problem underlying this invention is that of interengaging with a minimum of shock the elements of a dog clutch used in the power transmission mechanism of a machine tool, and particularly a clutch having single interengaging parts on its two members such that there is only one position in each rotation at which engagement can be effected. Such a clutch is required for example in a grinding machine used for grinding the faces of toothed wheels, spline shafts, or the like, where it serves to effect a detachable driving connection between a source of motion, and, say, a slide or work-spindle operating mechanism, where it is essential that the two members of the clutch shall be engageable only when the said members are in a particular angular relationship.

The object of the present invention is to enable the above requirement to be satisfied in a simple and convenient manner.

In the accompanying sheets of explanatory drawings—

Figure 1:
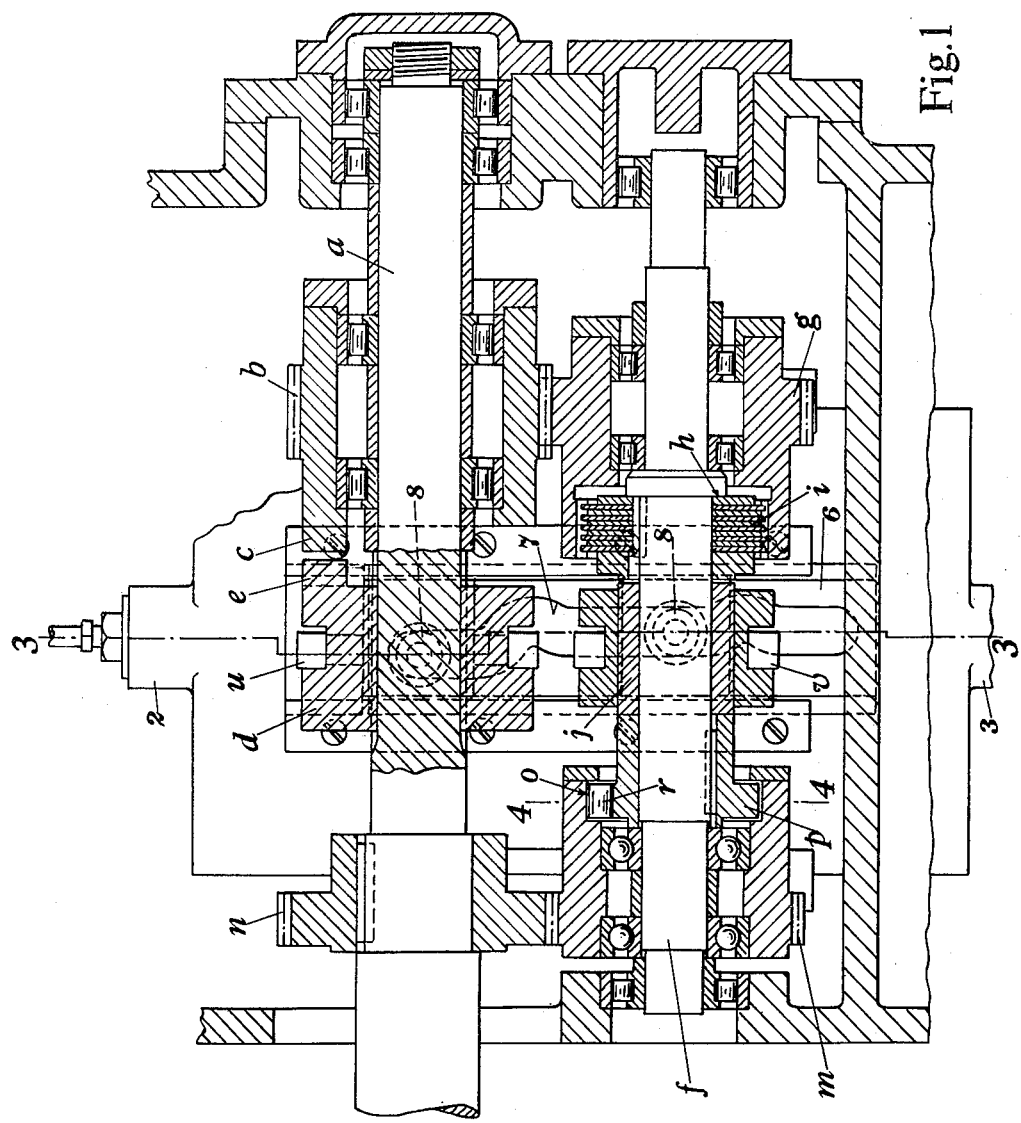
Figure 1 is a sectional front elevation, and Figure 2 a part sectional plan, of clutch controlled power transmission mechanism in accordance with the invention.
Figure 4:
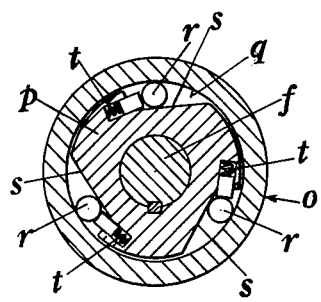
Figure 4 is a section on the line 4—4 of Figure 1.
Figure 3:
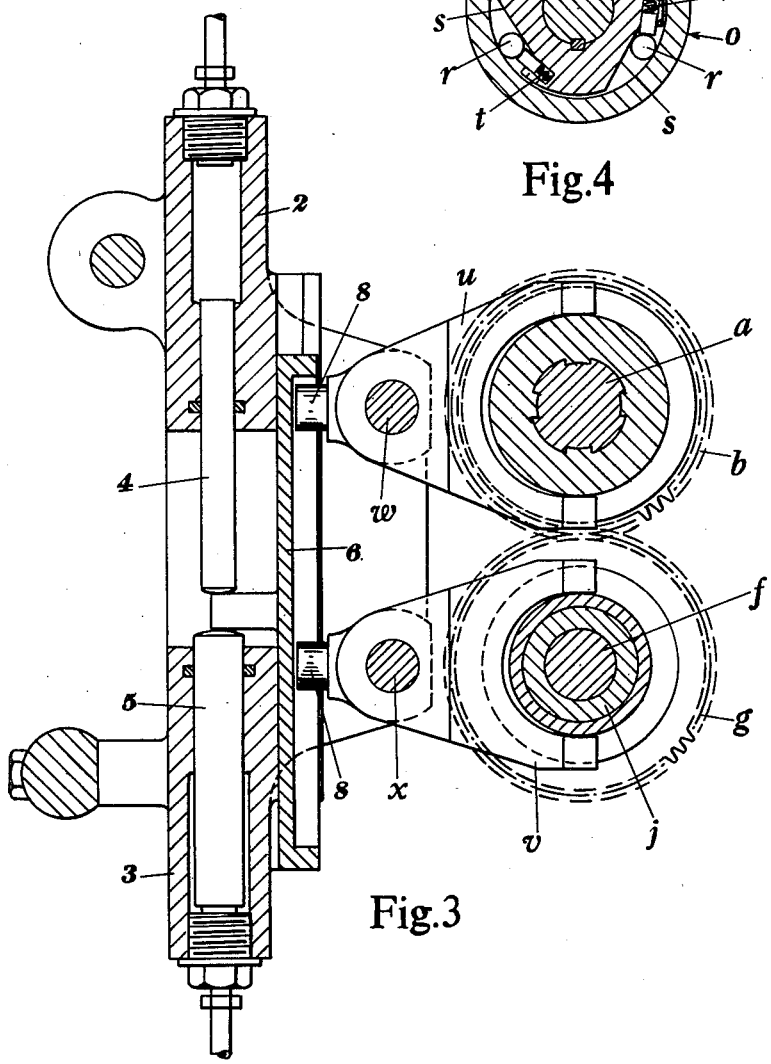
Figure 3 is a section on the line 3—3 of Figure 1.

In carrying the invention into effect as shown, I employ a shaft $a$ (herein termed the main shaft) on which is freely mounted a toothed wheel $b$ which is driven from any convenient source of motion. At one side of the wheel $b$ is formed or secured a single laterally projecting tooth $c$, the wheel and its tooth serving as the driving member of a dog clutch. The complementary or driven member $d$ of this clutch is slidably keyed on the main shaft $a$, and is provided with a single tooth $e$ for engaging tooth $c$ of the other clutch member. Parallel with the main shaft $a$ is arranged a lay shaft $f$. On the lay shaft $f$ is freely mounted a toothed wheel $g$ which engages the toothed wheel $b$ on the main shaft $a$, and which has combined with it any convenient friction clutch $h$. This clutch $h$ may consist of a plurality of friction plates $i$, which are alternately connected to the toothed wheel $g$ and the lay shaft $f$, and on this shaft is slidably mounted a pressure piece $j$ which by exerting endwise pressure on the friction clutch effects a frictional driving connection between the wheel $g$ and shaft $f$ through the clutch plates. Also on the lay shaft $f$ is mounted another toothed wheel $m$ which engages a further toothed wheel $n$ secured to the main shaft $a$. The toothed wheel $m$ on the lay shaft $f$ is connected to this shaft by a unidirectional clutch $o$ of any convenient form. In the example shown this unidirectional clutch comprises an annular member $p$ secured on the lay shaft $f$, and surrounded by an annular recess $q$ in one end of the toothed wheel $m$, and rollers $r$ arranged in recesses $s$ in the annular member and adapted to co-operate under the action of springs $t$ with the peripheral wall of the recess in the toothed wheel. The two pairs of toothed wheels $b$, $g$ and $m$, $n$ are such that the main shaft $a$ can be temporarily driven by the driving wheel $b$ through the lay shaft $f$ at a slightly slower rate than the driving wheel.

Any convenient means are employed for sliding the slidable dog clutch member $d$ on the main shaft $a$ and the pressure piece $j$ on the lay shaft $f$. Thus we may employ for this purpose a pair of forked members $u$, $v$ which are slidably mounted on fixed guides $w$, $x$ arranged parallel with the shafts $a$, $f$, the forked members being adapted to embrace and engage grooved peripheral portions of the slidable dog clutch member $d$ and pressure piece $j$ respectively. The forked members $u$, $v$ are actuated in proper sequence by pressure fluid which is controlled either automatically in response to movements of parts of the machine on which the invention is employed, or in response to the attendant, the friction clutch $h$ being brought into action before the slidable dog clutch member $d$ is engaged with the other clutch member $b$, $c$. The mechanism employed for actuating the forked members $u$, $v$ in the example shown consists of a pair of coaxial hydraulic cylinders 2, 3, plunger 4, 5 slidable in the cylinders, and a slidable cam plate 6 actuated by the plungers, the cam plate being formed with an elongated recess or slot 7 adapted by engagement with rollers 8 or other projections on the forked members to move the latter in the proper sequence when movement is imparted to the cam plate.

The action of the mechanism above described is as follows:

Let it be supposed that both the dog clutch $b$—$e$ and the friction clutch $h$ are out of action, and that only the driving wheel $b$ on the main shaft $a$ and its associated wheel $g$ on the lay shaft $f$ are rotating. In this condition both shafts $a$, $f$ are at rest. To set the main shaft $a$ in motion, the friction clutch $h$ on the lay shaft $f$ is first brought into action. This has the effect of rotating the main shaft a (through the unidirectional clutch o) at a slightly slower rate than the driving wheel b. In this condition the dog clutch members b, c and d, e on the main shaft a can be interengaged with a minimum of shock. The main shaft a is now driven through the dog clutch b—c at its proper speed, and the unidirectional clutch o then ceases to be operative. At this stage the friction clutch h may be put out of action, and then the two wheels g, m on the lay shaft f rotate idly.

Whilst I have in the foregoing described a successful embodiment of my invention, I desire it to be understood that my invention is not limited thereto as subordinate mechanical details may be varied to suit different requirements.

Having thus described my invention what I claim as new and desire to secure by Letters Patent is:

1. Clutch controlled power transmission mechanism comprising the combination of a dog clutch consisting of a driving member and a driven member, a main shaft on which the driving dog clutch member is freely rotatable and on which the driven dog clutch member is slidably keyed, means for rotating the driven dog clutch member at a speed slightly slower than that of the driving dog clutch member, the said means having in combination a driving toothed wheel associated with the driving dog clutch member, a lay shaft arranged parallel with the main shaft, a second toothed wheel freely rotatable on the lay shaft and adapted to receive motion from the first mentioned toothed wheel, a friction clutch for connecting the second toothed wheel to the lay shaft, a third toothed wheel mounted on the lay shaft, a unidirectional clutch connecting the third toothed wheel to the lay shaft, and a fourth toothed wheel secured on the main shaft and engaging the third toothed wheel, and means for actuating the dog and friction clutches.

2. Clutch controlled power transmission mechanism comprising the combination of a dog clutch consisting of a driving member and a driven member each having a single clutch tooth, a main shaft on which the driving clutch member is freely rotatable and on which the driven dog clutch member is slidably keyed, a lay shaft arranged parallel with the main shaft, a friction clutch mounted on and adapted to impart motion to the lay shaft, a unidirectional clutch mounted on the lay shaft, gearing through which the unidirectional clutch can serve to transmit motion from the lay shaft to the main shaft at a speed slightly slower than that of the driving dog clutch member, and means for actuating the friction and dog clutches so that the friction clutch comes into action before the dog clutch.

HAROLD RICHARD BAGLEY.